United States Patent
Boyer et al.

(10) Patent No.: US 9,088,665 B2
(45) Date of Patent: Jul. 21, 2015

(54) CONTEXT AWARENESS FOR A MOBILE COMMUNICATION DEVICE

(75) Inventors: David Gray Boyer, Oceanport, NJ (US); Kevin J. Nelson, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1726 days.

(21) Appl. No.: 11/476,064

(22) Filed: Jun. 28, 2006

(65) Prior Publication Data

US 2007/0032261 A1    Feb. 8, 2007

Related U.S. Application Data

(60) Provisional application No. 60/694,241, filed on Jun. 28, 2005.

(51) Int. Cl.
*H04M 3/00* (2006.01)
*H04M 1/725* (2006.01)

(52) U.S. Cl.
CPC .................................. *H04M 1/72566* (2013.01)

(58) Field of Classification Search
USPC ............... 340/10.1, 572.1; 458/456.1–456.6, 458/41.2, 41.3; 455/556.2, 550.1, 414, 455/456.1, 418, 466; 342/357.09
See application file for complete search history.

(56) References Cited

U.S. PATENT DOCUMENTS

| | | | | |
|---|---|---|---|---|
| 7,426,197 | B2 * | 9/2008 | Schotten et al. | 370/328 |
| 8,820,629 | B1 * | 9/2014 | Galvin et al. | 235/375 |
| 2001/0049275 | A1 * | 12/2001 | Pierry et al. | 455/414 |
| 2002/0070862 | A1 * | 6/2002 | Francis et al. | 340/572.1 |
| 2002/0145561 | A1 * | 10/2002 | Sandhu et al. | 342/357.09 |
| 2003/0054866 | A1 * | 3/2003 | Byers et al. | 455/567 |
| 2004/0203944 | A1 * | 10/2004 | Huomo et al. | 455/466 |
| 2005/0153729 | A1 * | 7/2005 | Logan et al. | 455/550.1 |
| 2005/0202832 | A1 * | 9/2005 | Sudit | 455/456.1 |
| 2005/0245271 | A1 * | 11/2005 | Vesuna | 455/456.1 |
| 2006/0028343 | A1 * | 2/2006 | Taylor et al. | 340/572.1 |
| 2006/0063563 | A1 * | 3/2006 | Kaufman | 455/556.2 |
| 2006/0094411 | A1 * | 5/2006 | Dupont | 455/417 |
| 2006/0094412 | A1 * | 5/2006 | Nonoyama et al. | 455/418 |
| 2006/0208888 | A1 * | 9/2006 | Patel et al. | 340/572.1 |

* cited by examiner

*Primary Examiner* — German J Viana Di Prisco
(74) *Attorney, Agent, or Firm* — Muncy, Geissler, Olds & Lowe, P.C.

(57) ABSTRACT

A system and method recognize a context or environment, within which a mobile communication device is resides, without necessarily knowing the actual location of the mobile communication device. The system and method establish one or more communication rules for the mobile communication device based upon the recognized context.

20 Claims, 4 Drawing Sheets

| FIRST SEGMENT CONTEXT IDENTIFIER | SECOND SEGMENT LOCATION IDENTIFIER | THIRD SEGMENT USER IDENTIFIER | |
|---|---|---|---|
| 01 RED | J2-35DN6JS71L | W32-43FZ1 | |
| 01 RED | 5Y-3HSJ79S2J5 | W32-43FZ1 | |
| 01 RED | 0L-CBV12X3J90 | W32-43FZ1 | |
| 02 YELLOW | PO-M48S2NF547 | W32-43FZ1 | |
| 02 YELLOW | 36-DBN23N465M | W32-43FZ1 | |
| 02 YELLOW | 12-SFRT4562J8 | W32-43FZ1 | |
| 03 GREEN | BF-RT563YT6U5 | W32-43FZ1 | |
| 03 GREEN | 2K-CB35S42G7H | W32-43FZ1 | |
| 03 GREEN | 09-D4H2J7KN2A | W32-43FZ1 | FIRST USER A |
| 01 RED | W3-3WMBT7D12H | Y18-561QW | |
| 01 RED | 90-S63J67K3ND | Y18-561QW | |
| 01 RED | 2J-II6BB25G7S9 | Y18-561QW | |
| 02 YELLOW | C8-P2N452V7X7 | Y18-561QW | |
| 02 YELLOW | E3-VBR72MXWQ1 | Y18-561QW | |
| 02 YELLOW | 2E-T647VNB3NW | Y18-561QW | |
| 03 GREEN | 5I-O0BNPN3456 | Y18-561QW | |
| 03 GREEN | WM-89865K07GH | Y18-561QW | |
| 03 GREEN | EE-454NM3WW2F | Y18-561QW | SECOND USER B |
| 01 RED | 97-H980PMR4C6 | 6H7-3W21J | |
| 01 RED | 2N-7F48DFKWQ8 | 6H7-3W21J | THIRD USER C |

FIG. 5

CONTEXT AWARENESS FOR A MOBILE COMMUNICATION DEVICE

This application is a conversion of provisional patent application 60/694,241, filed Jun. 28, 2005, the entire contents of which are herein incorporated by reference.

BACKGROUND OF THE INVENTION

1. Field of the Invention

The present invention relates to a mobile communication device, such as a cellular telephone, a personal digital assistant (PDA), or a laptop computer. More particularly, the present invention relates to a system and method for recognizing a context or environment, within which the mobile communication device is located, and establishing one or more communication rules for the mobile communication device based on the context.

2. Description of the Related Art

Systems and methods are known in the background art for tracking the location of a mobile communication device. For example, business cellular telephones or employee ID cards can incorporate an RFID tag, which may be read by interrogators throughout an office building, such that the employee's location may be tracked.

Also, many cellular telephones have GPS receivers, such that the cellular telephone's location may be obtained by the service provider. Also, there are triangulation methods, whereby a cellular telephone's location may be estimated by the service provider based upon signal strength measurements.

SUMMARY OF THE INVENTION

The present inventors have appreciated drawbacks in the systems and methods of the background art.

The systems and methods in accordance with the background art track the actual location of the users. Many users object to this tracking as an invasion of privacy. However, it would be less objectionable if a general context were tracked as opposed to a specific location. For example, most users would not object to tracking of the user's environment, such as between four possible contexts, like a restricted or quiet area (e.g. church, movie theatre, airplane); an inconvenient area (like a restaurant, boss's office, hospital, at home after 9 pm); an impaired ability area (like inside of a motor vehicle or while riding a bicycle, where the user's attention should not be diverted), and a full access area.

Moreover, the inventors have appreciated that users, and possibly employers, would like to have some level of control to set limits on the accessibility of users via their mobile communication device. It would therefore be advantageous to provide a system and method whereby communication rules may be established for communications with respect to a mobile communication device based upon the context of the mobile communication device.

These and other object are accomplished by a system and method which recognize a context or environment, within which a mobile communication device resides, without necessarily knowing the actual location of the mobile communication device. The system and method establish one or more communication rules for the mobile communication device based upon the recognized context.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is an example of potential codes for the RFID tags of three users; and

DETAILED DESCRIPTION OF PREFERRED EMBODIMENTS

Figure 1:
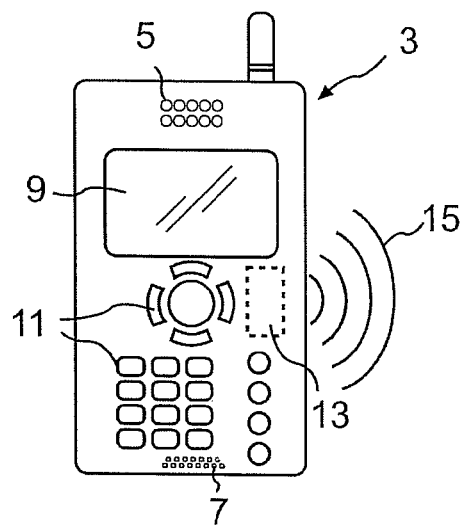
FIG. 1 is a perspective view of a cellular telephone, in accordance with the present invention.

FIG. 1 is a perspective view of a cellular telephone 3, in accordance with the present invention. The cellular telephone 3 includes typical structural features, such as a speaker 5, microphone 7, display 9 and a plurality of user input keys 11. The cellular telephone 3 also includes an interrogator 13. As can be seen in FIG. 1, the interrogator 13 is embedded within a housing of the telephone 3. In the illustrated embodiment, the interrogator 13 is a radio frequency identification (RFID) scanner. Such RFID scanners transmit a signal 15 to power a passive RFID tag and read a code emitted from the RFID tag, in a known manner.

Figure 2:
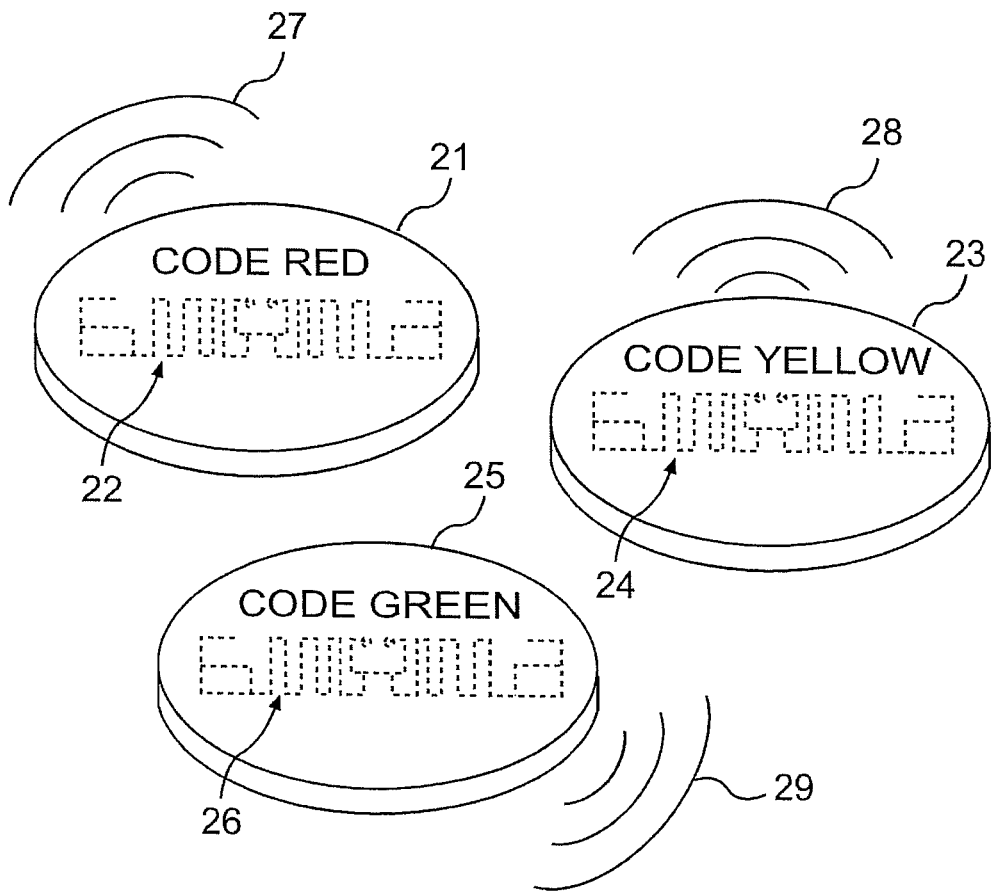
FIG. 2 is a perspective view of several different types of labels with RFID tags, in accordance with the present invention.

FIG. 2 illustrates a plurality of different labels. A first label 21, with the words "code red" printed thereon, includes an embedded first RFID tag 22. A second label 23, with the words "code yellow" printed thereon, includes an embedded second RFID tag 24. A third label 25, with the words "code green" printed thereon, includes an embedded third RFID tag 26. The first, second, and third RFID tags 22, 24 and 26 emit first, second and third unique codes 27, 28 and 29, respectively, when powered by an interrogator, such as the interrogator 13 of the telephone 3. The first, second and third labels 21, 23 and 25 are preferably formed of a durable material, such as plastic.

Figure 3:
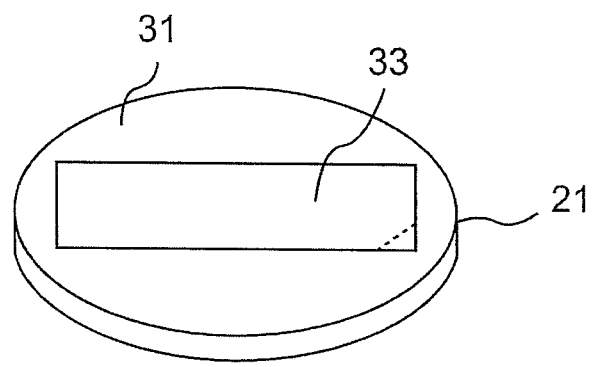
FIG. 3 is a perspective view of a backside of one of the labels of FIG. 2.

FIG. 3 illustrates a backside 31 of the first label 21. The backside 31 includes a doubled-sided adhesive tape 33, such that the first label 21 may be attached to a surface. The backsides of the second and third labels 23 and 25 are constructed in a similar manner.

Figure 4:
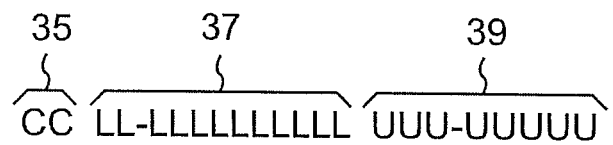
FIG. 4 is an example of a code format for the RFID tag.

FIG. 4 illustrates one example, of a code format emitted from the first, second, and third RFID tags 22, 24 and 26. A first segment 35 represents the context type for the RFID tag. For example, there may be only three context types, e.g. red, yellow and green, as illustrated in FIG. 2. Under such circumstance, it would be possible for the first segment to be fully represented by two binary digits, providing up to four unique context types. However, it is envisioned that there may be several context types. For example, perhaps up to ten context types, in more complex systems, as will be discussed hereinafter.

A second segment 37 of the RFID tag provides a unique code for each RFID tag, making each RFID code different. No two labels of the same context, i.e. having a same first segment 35, would have a same second segment 37. Once the label is installed in a particular location, the second segment 37 would be mapped to that location in a database. For example, the label could be located above a ceiling tile in a boardroom, and the unique second segment 37 could be stored in a database in association with the sixth floor boardroom of XYZ building at 123 Main St., City, State.

A third segment 39 of the RFID code is semi-unique. In other words, there would perhaps be batches of three or five or ten labels of a same context, i.e. having a same first segment 35, which have a unique second segment 37, and a same third segment 39. The third segment 39 could be used to link a label to a user's identity.

FIG. 5 illustrates a code, where batches of three common third segments 39 are employed for each context. A first user A would receive three each of the code red, yellow and green labels 21, 23 and 25. The first user A would have his name, address and/or mobile communication device's internal ID code stored in a database in association with the third segment "W32-43FZ1". Likewise, a second user B would have his name, address and/or mobile communication device's internal ID code stored in a database in association with the third segment "YI8-561QW," and would be provided three each of the code red, yellow and green labels 21, 23 and 25.

Now, a first embodiment of the operation of the present invention will be described wherein an employer of a business, a government agency, an educational facility or other large facility provides its members (e.g. users) with a plurality of the first, second and third labels 21, 23 and 25. The common third segment 39 of the labels 21, 23 and 25 provided to a particular user would be noted and stored in a database in association with the user's identity and/or in combination with an ID number of the mobile communication device of the user.

A user would take the labels and place them in locations where he wishes to control the communication rules for his mobile communication device, e.g. cellular telephone. For example, the code red labels 21 could be placed in such locations as a bedroom, inside a bible taken to church, on a bicycle's handle bars, a bathroom stall, etc. The code yellow labels 23 could be placed in the user's car, vacation house, in a boat, on a treadmill, etc. The code green labels 25 could be placed in such locations as the user's general living quarters, e.g. living room, kitchen, porch, etc.

The user would access software provided on the employer's server and input the communication rules for each of the types of labels. It is envisioned that the software would be windows based and would provide various levels of communication restrictions which could be implemented by clicking one or several check boxes for each context code level of the labels 21, 23 and 25.

For example, in the code red level, the user could select to receive no calls, and could select to receive no instant messages (IMs). The software could prompt the user to select a prestored prompt, such as "The user you are trying to reach is not available. Please leave a message." There could also be a selectable option to record the user's own custom message.

For the code yellow level, the user might select an option to play a prompt to the caller, such as "The person you have called is not in a convenient location to answer your call and requests that you leave a voicemail message. Press 1 to leave a voice mail message, or press 2 to ring the person you called." Also, the user may select to receive no IMs. The sender of an IM to the user would automatically receive a reply like, "The recipient is unavailable and will be delayed in responding to your message."

For the code green level, the user might select an option to play a prompt to the caller, such as "The person you have called is no longer at work, if you still wish to call this person press 1, otherwise press 2 to leave a voicemail message." Further, the user might select to receive IMs in the code green level.

The above situations are only examples. Users should be given options to record their own prompts. Also, users may elect to restrict instant messages, emails, faxes and other types of communications for each code level. Additional time zone restrictions may be placed on each code level. For example, different or more restrictive limitations may be placed on the code yellow context between the hours of 10 pm and 6 am.

Optionally, the user may exclude certain persons from the communication rules of one or more code levels. The user may enter certain telephone numbers or names into a preferred list. When caller ID or other supplemental data indicates that a listed preferred person is calling, emailing, etc. that call or message will bypass one, several or all of the communication restrictions for the particular code level, as determined by the user's preselections in the software.

Further, the user may add additional communication restrictions to certain persons at one or more of the code levels. The user may enter certain telephone numbers or names into a blocked list. When caller ID or other supplemental data indicates that a blocked person is calling, that call will be restricted by a special set of communication restrictions which are preselected by the user in the software. For example, a bothersome co-worker may be directed to the user's voicemail at all code levels.

Although the above discussion has focused on users establishing the communication rules for the various code levels. It is also possible that an employer may establish some or all of the communication rules for each code level, which may not be changed by the employees. Alternatively, employees may be given discretion, but also limits, upon the restrictions, which may be imposed at each code level.

The reason that the third segment 39 of the RFID code is provided is so that individual employees may pick and chose their particular context areas (e.g. their particular code red areas or code yellow areas). If the third segment 39 were not provided, then a first employee might enter an area where a second employee placed a code red label 21, and the first employee's mobile communication device would then be restricted under the first employee's rules for code red areas. By including the third segment in the RFID code, the first employee's interrogator would recognize that the second employee's RFID tag was not intended for the first employee's mobile communication device, and no parameter change of the first employee's mobile communication device would occur.

Employers may have RFID tags with master codes in the third segment, such that all mobile communication devices of employees must adhere to the employer's imposed context for that area. If all RFID tags were placed in the building by the employer and employees were not given RFID tags to place in the employee's discretion, there would be no need for the third segment 39, as there would be no need to discriminate between the mobile communication devices of various employees. Rather, all of the employees' mobile communications devices would acknowledge certain areas as a code red context, a code yellow context or a code green context, depending upon where the IS department of the employer placed the labels 21, 23 and 25 throughout the building complex.

Now, a second embodiment of the operation of the present invention will be described wherein a cellular service provider (e.g. VERIZON, SPRINT) provides its subscribers with the first, second and third labels 21, 23, and 25. The method of operation would be nearly identical to the method discussed above, except here the third segment 39 of the RFID code to identify the subscriber or subscriber's device would be necessary. Otherwise, the communication control parameters of a particular subscriber's mobile communication device would be altered whenever the subscriber unknowingly traveled near an RFID tag placed in an area by another subscriber. If subscribers are free to place the labels 21, 23 and 25 in locations as they see fit, then it would be necessary to identify the tags to the subscriber so as not to effect the operation of mobile communication devices of other subscribers.

It is also possible for the serve provider to have a master code which is recognized as a controlling code by the mobile communications devices of all subscribers. Tags with the master code could be placed in certain areas by the service provider (e.g. Verizon), such within restaurants, movie theaters, etc. to imposed mandatory code red zone for all of the service provider's subscribers.

Figure 6:
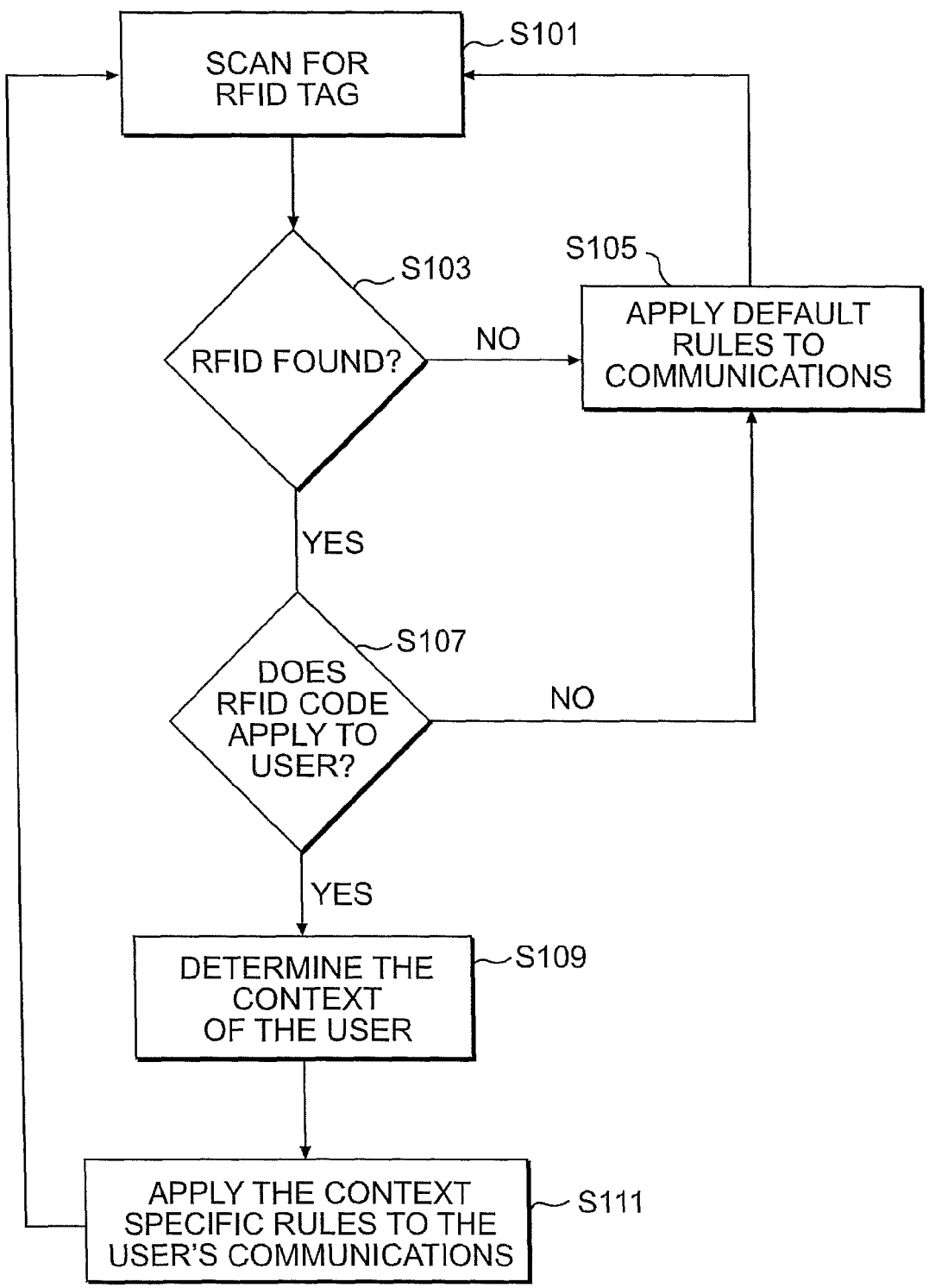
FIG. 6 is a flow chart illustrating one embodiment of a method of the present invention.

FIG. 6 is a flow chart illustrating an operation of the system of the present invention. In step S101, the interrogator 13 of mobile communication device 3 scans for any RFID tag 21, 23 or 25 in the vicinity, such as within 15 to 50 feet. In step S103, a controller of the mobile communication device 3 determines whether or not an RFID code was received. If not, default communication rules are applied to the mobile communication device 3 in Step S105.

If an RFID code is received, the process proceeds to step S107. In step S107, the controller determines if the RFID code applies to the mobile communication device 3. This may be accomplished by reviewing the third segment 39 of the RFID code to see if it matches the ID of the mobile communication device or user or if the third segment is a master code. If not, the process proceeds to step S107.

If the RFID code applies to the mobile communication device 3, the controller determines the context in Step S109. This may be accomplished by reviewing the first segment 35 of the RFID code. Once the context is determined, context specific rules are applied to communications of the mobile communication device 3. The context specific rules may be applied at the service provider level, at a business server level, or by the controller of the mobile communication device 3.

The second segment. 37 of the RFID code is optional to the first and second embodiments discussed above, i.e. the business environment and the consumer environment. If the second segment 37 is included, the mobile communication devices will have a powerful and accurate tracking supplemental tracking system. GPS does not work well inside buildings or downtown city areas. Likewise, signals reflection off of walls and buildings to distort signal triangulation methods. However, the location tracking of the present invention will be extremely accurate in these types of situations because the system will be able to determine that the mobile communication device 3 is near a fixed and known location, as defined by the second segment 37 of the RFID code of the tag 21, 23 or 25.

If the second segment 37 of the RFID code is included in the tag, it is envisioned that the user would be able to enable or disable the reading or transmission of the second code segment 37 by operating a menu selection on the mobile communication device 3.

The systems and methods of the present invention offer many advantages over the background art. Determining a user's context (the type of area where he or she is) is important for determining whom the user may want to communicate with. In the Presence Awareness systems of the present invention, contextual information can be used as a component in discriminating between persons who may readily communication with the user. If a user is at home, he may only want friends and certain business contacts to be able to reach him. When at work, the user may have a different set of persons who will be permitted to contact him. When in his a car, a user may only want to receive calls from his boss and family, he may also want to ensure no instant messages (IMs) are sent to him, as he could not safely reply.

Systems, in accordance with the background art, keep track of the physical location of a user and map that location to a specific place or address. This is does by having the user carry a GPS enabled device, or locating a transmission signal of a user carried device using various triangulation techniques. These solutions require knowledge of the actual physical location of the user in order for the system to determine the user's context. For this method to work, a user must register with a central controller of a local enterprise, so that the enterprise can track the user. Many users do not want to be tracked by an enterprise in which they have no control over how this information is treated.

The proposed invention gives the user complete control over keeping track of their context, as opposed to location. In other words, the user's device can automatically provide information to a central controller about their communication accessibility level which information is based upon the type of environment the user is in (i.e. the user's context), without providing the central controller with the actual physical location of the user. For example, the context could be "I am in my car" (but the central controller would have no idea of the car's location or whether the car was moving or not), or "I am at home" (but the central controller need not know the address of the home), or "I am in a quiet zone", where a quiet zone could be a restaurant, movie theatre, courtroom, airplane, etc. (but the central controller need not know the physical location of the user of even the type of place other than the general context of a "quiet zone").

To track the context of the user's environment, the user utilizes the RFID scanner to track tagged locations; the user tracks the location information and sends this information back to their trusted Presence Server via a secure wireless connection (VPN), or via a cellular or internet connection. The user's location is not being tracked by a central monitoring facility in the present invention, rather the user's device controls any location tracking, and the user's context is tracked by the central monitoring facility rather than the user's location. Moreover, an exact location (e.g. address) need not be tracked or transmitted. Rather, only a context location needs to be tracked and sent.

For example, the user may be permitted four types of "context" zones (e.g. high privacy, business mode, travel mode, and home mode). The high privacy mode may be areas or zones were communications to the user should be highly restricted to only selected individuals (the user's doctor or lawyer and one personal secretary). Such zones could be a boardroom, the CEO's office, a courtroom, a movie theatre, a concert hall, etc. In some embodiments, the user may select the high privacy zones, in other embodiments, the business may establish high privacy zones which are to be accepted by the business's employees.

When a user is in a high privacy zone, communications to the user are routed through and filtered by the central controller. If the communication source is on the preferred list (e.g. the user's doctor or lawyer or designated secretary), the communication is permitted to pass to the user. If the communication source is not on the preferred list, the communication is sent to the user's voicemail system or the sender is given the option to press a button for an emergency situation and the call is transferred to the user's designated secretary or receptionist, who can screen the call and who has authority to forward the call to the user, while the user is in the high privacy zone, if needed.

It is possible to provide the user's secretary access to the user in all of the user's contexts. Under this circumstance, it is important to alert the secretary of the user's present context, since the secretary may not have actual knowledge of the user's context when placing a call.

For example, assume the user tells his secretary that he is going to the file room and can be reached on his cellular telephone. On the way to the file room the user is pulled into the CEO's office for an emergency meeting. While in the meeting, the secretary gets a business solicitation call and is asked to pass generally unimportant information to the user. If the secretary is unaware of the user's location at the moment, the secretary may decide to call the user on the user's cell phone and pass on the unimportant information immediately. If the user were in a high privacy area, such as the CEO's office, the secretary's call would interrupt the meeting because of the secretary's authority to call the user in the high privacy area and her lack of knowledge that the user was actually in the high privacy area.

Therefore, the present invention can provide an extra layer of protection. Whenever, a designated authorized caller attempts to reach the user, the central controller may issue a voice prompt, such as "please note the person you are trying to reach is presently in a high privacy area and should typically not be interrupted in this location, do you still wish to contact them at this time? Press one to go to the user's voice mail, press two to continue the call." This message would alert the secretary that the user is indeed not in the file room and has been called away to some other context, which is classified as a high privacy context. Note that the secretary/system does not know the exact location, but only the context. The good secretary would then opt to leave a message in the voice mailbox or simply hang up.

The user could also discriminate between the types of messages which the central controller will allow to pass to the user while the user is in the high privacy context. For example, the user may accept only IMs from only designated individuals since IMs are silent and can be retrieved at a time convenient to the user.

Also, once the context is read by the cellular telephone (e.g. by a reader in the cellular telephone reading an RFID tag in the ceiling of the boardroom), the cellular telephone's internal settings can be automatically changed by the controller of the cellular telephone to reflect the context of the user. For example, the cellular telephone's ring tone can be shut off and the cellular telephone set to vibrate mode for incoming calls. Once the cellular telephone leaves the high privacy context, the settings of the cellular telephone may be automatically restored. To determine when the cellular telephone enters or leaves a certain context, the cellular telephone may sweep or check the area for RFIDs at certain time intervals, e.g. every 1, 2, or 5 seconds. When a predetermined number of sweeps for the RFIDs indicates an absence of the high privacy RFID, it will be assumed that the cellular telephone has left the high privacy context and the default settings of the cellular telephone will be restored.

This sweeping or checking for RFIDs would also control the context communication settings for the cell phone. For example, after the cellular telephone leaves the high privacy context, the cellular telephone will sweep or check for a new RFID, if a new RFID were detected, the new context communication setting for the cellular telephone would be implemented. For example, if the area directly outside the CEO's office were a lobby area which had "business mode" RFIDs in the ceiling, the cellular telephone would read these RFIDs and switch to the business mode context for filtering incoming communications.

If no RFID were present in the vicinity of the cellular telephone, the cellular telephone would switch to a default communication context. The default communication context could be selected by the user in a menu of the software, discussed above, and be a fifth context having its own filter for the classes of persons allowed to communicate with the user's cellular telephone, filter for the types of message to be accepted by the user's cellular telephone, and settings for the voice prompts to be issued to callers before they can communicate with the user via the cellular telephone. Alternatively, the user could specify that the default settings be equal to the settings of one of the four other defined communication contexts (e.g. "business mode" or "home mode").

Each of the user's contexts may be custom tailored by accessing the computer software program of the central controller. In a preferred embodiment, the IS department of a business would be primarily responsible for setting up the system. The IS department would place the different context RFID tags in the appropriate locations throughout the building complex. The IS department would set up default context categories and rules. For example, the CEO may contact all users regardless of context, etc. In the "business mode" context all callers within the same business (as identified by a extension or the fact that the call originated within the local area network (LAN)) could be given different treatment.

For example, if a file room staff person receives a call on a company-provided cellular telephone while they in their work area (e.g. file room) and the call originated inside of the business itself, the call would immediately go through. If the file room staff person receives a call on the company's cellular telephone from outside of the business itself, the caller could be greeted by a voice prompt of the central controller alerting the caller that they are calling a person at their place of employment and asking the caller to press one to complete the call if the call is an emergency or of a business nature and to press two if the call is a personal call and should be directed to a voice mailbox. Also, such calls could be tracked and monitored as to the caller's number, the number of occurrences and duration.

Further, the communication context for the file staff person could be setup by the IS department to permit all calls, whether inside the business or outside the business, to pass directly to the cell phone during certain times of the day (e.g. lunch hour and between the hours of 5 pm to 9 am). Also, the context profile could allow incoming calls when the file room staff person's cellular telephone is located outside of the building, or in a break room or a lunchroom, since these contexts would be determinable by the presence of RFID tags placed in these areas.

The IS department would also provide certain employees with RFID tags to place outside of the business. For example, one or more tags would be provided for the user's vehicles, and one or more tags could be provided for the user's home. The user would then access their profile on the software and have certain flexibility in selecting who has access to them in certain contexts, i.e. which employees of the business or persons outside the business may contact the user in their vehicle or at their home. The callers could be identified by various caller ID information, such as complete telephone numbers, area codes only (e.g. enable all calls from area code 571), city codes (enable all calls from 571-205), persons names (as extracted from caller ID information). Emails could be similarly filtered, e.g. by the entire sender's email address or by accepting all emails from certain addresses (e.g., ?@avaya.com and ?@uspto.gov).

The user could also set up who should have direct access or need to pass through certain voice prompts before reaching the user. The voice prompts could be selected as default prompts or the user could record them to be customized, e.g. "Please don't disturb me at home unless you know that I wanted you to call me or it is truly important, press one to continue or two to leave me a voice mail." The user could also set up what types of communications (voice calls, emails, faxes, IMs, voicemail, etc.) will be received in each of the various contexts.

As an example, a doctor who typically calls the user about a sick relative could be setup in the menu to have her call go straight through without a voice prompt, the police and other emergency services could, by unchangeable default, be set to go straight through without a voice prompt. The set up menu provides the user with great flexibility to set, store and change parameters to customize the system to best fit the user's needs.

Although the system has been described thus far as being employed in a business context, the system could be employed in a personal context to manage personal cellular phone calls. For a personal account, a cellular service provider (such as Verizon or Sprint) would provide the user with a dozen or so RFID tags, each labeled or color-coded, e.g. four red, six green, and two yellow RFID tags. On the Internet the user would specify the communication rules for each type (e.g. color) of RFID tag.

The green tags could be placed around the user's work area and serve to restrict personal and solicitation cellular telephone calls and emails at work. The red tags could be located around the home and used to restrict work-related calls and emails and to restrict home sales calls and emails. The yellow tags could be placed in the user's vehicles. As an example, when the user is in the yellow context (i.e. in their vehicle), the context parameters could be set by the user to alert senders of IMs that the user is presently in a vehicle and unable to respond to IMs.

Although one advantage of the present invention is to automatically change communication restrictions based upon a user's context without actually tracking the user's location, the present invention could still have location tracking for emergencies. The second segment 37 of the RFID code could be registered to an actual location or an address (e.g., sixth floor boardroom A; Bridgeman Building—Room 6-C215; or 303 Chestnut Drive, Hometown, USA 11111).

The reader's transmitter, which transmits the RFID back to the central controller, would typically only transmit the first segment 35 of the RFID to the central controller. Hence, the system would function as detailed above. However, the user could set up the transmitter to transmit the first and second segments 35 and 37 of the RFID code, if desired. Such a modification could be made by a menu option of the user's device (cellular telephone, PDA, laptop). The user might desire location tracking as opposed to context tracking, in cases of an emergency or when the user is lost or feels sick or scared of attack, so that the user could be located, if needed.

An optional feature would also be that the service provider could transmit a master code to the user's device (cellular telephone, PDA, laptop, etc.) which would force the user's device to transmit the second segment 37 of the RFID code, such that the user's location could be tracked. This option would be useful in cases of medical emergency, or to assist the police in the apprehension of criminals or recovery of lost or kidnapped individuals.

Although the present invention has been described in conjunction with an RFID interrogator 13, other types of interrogators or scanners are possible. A preference is choosing an interrogator would be to select one which can scan tags at a distance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A method of establishing communication rules for a mobile communication device of a user comprising:
    placing a first RFID tag at a first location, the first RFID tag including a first code segment indicating a context of the first location and a second code segment identifying a user of the mobile communication device;
    reading the first RFID tag with the mobile communication device;
    determining whether the second code segment of the first RFID tag identifies the user of the mobile communication device; and
    making a first change to a control parameter of the mobile communication device based on the context indicated by the first code segment of the first RFID tag only if the second code segment of the first RFID tag identifies the user of the mobile communication device.

2. The method of claim 1 including:
placing a second RFID tag at a second location, the second RFID tag including a first code segment indicating a context of the second location different than the context of the first location and a second code segment identifying the user of the mobile communication device;
    reading the second RFID tag with the mobile communication device; and
    making a second change to the control parameter, different than the first change to the control parameter, only if the second code segment of the second RFID tag identifies the user of the mobile communication device.

3. The method of claim 1,
wherein the first RFID tag includes a third code segment indicating a physical location of the first RFID tag.

4. The method of claim 1,
wherein said method of reading the first RFID tag occurs without user input, by automatically scanning for an RFID tag in a local environment using an interrogator of the mobile communication device;
    wherein the mobile communication device transmits at least a portion of the read RFID tag to a service provider and the service provider performs said method of making the first change to the control parameter of the mobile communication device.

5. The method of claim 4, wherein the first change to the control parameter results in incoming calls being restricted and callers being prompted to leave a voicemail message at the service provider level.

6. The method of claim 4, wherein the first RFID tag includes a third code segment representing a physical location of the first RFID tag.

7. The method of claim 6, wherein the third code segment is transmitted to the service provider at the discretion of the user of the mobile communication device.

8. The method of claim 4, wherein the first change to the control parameter changes the ability of the mobile communication device to receive an incoming call or text message.

9. The method of claim 4, wherein the mobile communication device compares the read first code segment of the first RFID tag to codes stored in a memory of the mobile communication device and a controller of the mobile communication device makes the first change to the control parameter of the mobile communication device based upon the comparison.

10. The method of claim 9, wherein the first change to the control parameter is switching the mobile communication device's incoming call alert from a ring mode to a vibration mode.

11. A method of establishing communication rules for a mobile communication device of a user comprising:
  placing a first tag at a first location, the first tag including a first code segment indicating a context of the first location and a second code segment identifying a user of the mobile communication device;
  reading the first tag with the mobile communication device;
  determining whether the second code segment of the first tag identifies the user of the mobile communication device; and
  making a first change to a control parameter of the mobile communication device based on the context indicated by the first code segment of the first tag only if the second code segment of the first tag identifies the user of the mobile communication device.

12. The method of claim 11 including:
  placing a second tag at a second location, the second tag including a first code segment indicating a context of the second location different than the context of the first location and a second code segment identifying the user of the mobile communication device;
  reading the second tag with the mobile communication device; and
  making a second change to the control parameter, different than the first change to the control parameter, only if the second code segment of the second tag identifies the user of the mobile communication device.

13. The method of claim 11, wherein the first tag includes a third code segment indicating a physical location of the first tag.

14. The method of claim 11, wherein said method of reading the first tag occurs without user input, by automatically scanning for a tag in a local environment using an interrogator of the mobile communication device; and
  wherein the mobile communication device transmits at least a portion of the read tag to a service provider and the service provider performs said method of making the first change to the control parameter of the mobile communication device.

15. The method of claim 14, wherein the first change to the control parameter results in incoming calls being restricted and callers being prompted to leave a voicemail message at the service provider level.

16. The method of claim 14, wherein the first tag includes a third code segment representing a physical location of the first tag.

17. The method of claim 16, wherein the third code segment is transmitted to the service provider at the discretion of the user of the mobile communication device.

18. The method of claim 14, wherein the first change to the control parameter changes the ability of the mobile communication device to receive an incoming call or text message.

19. The method of claim 14, wherein the mobile communication device compares the read first code segment of the first tag to codes stored in a memory of the mobile communication device and a controller of the mobile communication device makes the first change to the control parameter of the mobile communication device based upon the comparison.

20. The method of claim 19, wherein the first change to the control parameter is switching the mobile communication device's incoming call alert from a ring mode to a vibration mode.

* * * * *